(12) United States Patent
Leasure et al.

(10) Patent No.: US 6,915,385 B1
(45) Date of Patent: Jul. 5, 2005

(54) APPARATUS FOR UNALIGNED CACHE READS AND METHODS THEREFOR

(75) Inventors: Terry Lee Leasure, Georgetown, TX (US); George Mcneil Lattimore, Austin, TX (US); Robert Anthony Ross, Jr., Cedar Park, TX (US); Gus Wai Yan Yeung, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/364,449

(22) Filed: Jul. 30, 1999

(51) Int. Cl.[7] .............................................. G06F 12/00
(52) U.S. Cl. ............................ 711/127; 711/3; 711/118
(58) Field of Search ................................ 711/201, 202, 711/217, 118, 3

(56) References Cited

U.S. PATENT DOCUMENTS 5,557,763 A * 9/1996 Senter et al. ................ 395/375
6,085,289 A * 7/2000 Thatcher et al. ............ 711/118
6,112,297 A * 8/2000 Ray et al. .................... 712/225

* cited by examiner

Primary Examiner—Kevin Verbrugge
(74) Attorney, Agent, or Firm—Winstead Sechrest & Minick P.C.; Mark E. McBurney (57) ABSTRACT

An apparatus and method for unaligned cache reads is implemented. Data signals on a system bus are remapped into a cache line wherein a plurality of data values to be read from the cache are output in a group-wise fashion. The remapping defines a grouping of the data values in the cache line. A multiplexer is coupled to each group of storage units containing the data values, wherein a multiplexer input is coupled to each storage unit in the corresponding group. A logic array coupled to each MUX generates a control signal for selecting the data value output from each MUX. The control signal is generated in response to the read address which is decoded by each logic array.

4 Claims, 10 Drawing Sheets

| PLA Address | 1 | 2 | 3 | ... | N |
|---|---|---|---|---|---|
| 0 | 0 | 0 | 0 | ... | 0 |
| 1 | 1 | 0 | 0 | ... | 0 |
| 2 | 1 | 1 | 0 | ... | 0 |
| 3 | 1 | 1 | 1 | ... | 0 |
| 4 | 1 | 1 | 1 | ... | 1 |
| ... | ... | ... | ... | ... | ... |
| N | 2 | 1 | 1 | ... | 1 |
| N+1 | 2 | 2 | 1 | ... | 1 |
| ... | ... | ... | ... | ... | ... |
| K-1-(N-1) | M-1 | M-1 | M-1 | ... | M-1 |
| K-N+1 | 0 | M-1 | M-1 | ... | M-1 |
| ... | ... | ... | ... | ... | ... |
| K-1 | 0 | 0 | 0 | ... | M-1 |

Fig. 5A

| PLA Address | 1 | 2 | 3 | 4 | 5 | 6 | 7 | 8 |
|---|---|---|---|---|---|---|---|---|
| 0 | 0 | 0 | 0 | 0 | 0 | 0 | 0 | 0 |
| 1 | 1 | 0 | 0 | 0 | 0 | 0 | 0 | 0 |
| 2 | 1 | 1 | 0 | 0 | 0 | 0 | 0 | 0 |
| 3 | 1 | 1 | 1 | 0 | 0 | 0 | 0 | 0 |
| 4 | 1 | 1 | 1 | 1 | 0 | 0 | 0 | 0 |
| 5 | 1 | 1 | 1 | 1 | 1 | 1 | 0 | 0 |
| 6 | 1 | 1 | 1 | 1 | 1 | 1 | 1 | 0 |
| 7 | 1 | 1 | 1 | 1 | 1 | 1 | 1 | 1 |
| 8 | 2 | 2 | 2 | 1 | 1 | 1 | 1 | 1 |
| 9 | 2 | 2 | 2 | ... | 1 | 1 | 1 | 1 |
| 10 | 2 | 2 | 2 | 2 | 2 | 2 | 2 | 1 |
| 11 | ... | ... | ... | ... | ... | ... | ... | ... |
| ... | 2 | 2 | 2 | 2 | 2 | 2 | 2 | 2 |
| 16 | 3 | 2 | 2 | 2 | 2 | 2 | 2 | 2 |
| 17 | ... | ... | ... | ... | ... | ... | ... | ... |
| ... | 7 | 7 | 7 | 7 | 7 | 7 | 7 | 7 |
| 56 | 7 | 7 | 7 | 7 | 7 | 7 | 7 | 7 |
| 57 | 0 | 7 | 7 | 7 | 7 | 7 | 7 | 7 |
| 58 | 0 | 7 | 7 | 7 | 7 | 7 | 7 | 7 |
| 59 | 0 | 0 | 0 | 7 | 7 | 7 | 7 | 7 |
| 60 | 0 | 0 | 0 | 0 | 0 | 7 | 7 | 7 |
| 61 | 0 | 0 | 0 | 0 | 0 | 0 | 7 | 7 |
| 62 | 0 | 0 | 0 | 0 | 0 | 0 | 0 | 7 |
| 63 | 0 | 0 | 0 | 0 | 0 | 0 | 0 | 7 |

Fig. 5B

APPARATUS FOR UNALIGNED CACHE READS AND METHODS THEREFOR

TECHNICAL FIELD

The present invention relates in general to data processing systems, and in particular, to unaligned reads from a cache having a fixed alignment of bytes on a fixed alignment boundary.

BACKGROUND INFORMATION

In order to reduce penalties in system performance due to accesses to and from relatively slow system memory, modern data processing systems employ memory caches constructed from high speed memory cells as an intermediate memory store between a central processing unit (CPU), and system memory. The cache memory may be internal to the CPU, a so-called level one (L1) cache, or the cache memory external to the CPU, a so-called level two (L2). Data and instructions are loaded from system memory into cache, and then fetched from cache by the CPU.

A typical cache organization incorporates a fixed alignment of data, which may, in a mixed cache, represent data or instructions on a fixed alignment boundary. In such a cache organization, the first data value in the cache has an address that is a multiple of a predetermined value. For example, a cache that is double-word aligned, in a data processing system having a word length of four bytes, has a first data value with an address that is a multiple of thirty-two. In other words, the first data value may have a relative address of 0, 32, 64, 96, etc. The subsequent bytes have relative addresses increasing consecutively, up to a width of the cache.

In order to effect an unaligned read, that is, a read in which the first data value does not correspond to the cache boundary, an entire cache line is accessed. Thus, for example, in a cache having a width of 64 bytes, an unaligned double-word read of eight consecutive bytes necessitates reading the entire 64-byte cache line. The 64-byte cache line is read out, and formatting circuitry, outside of the cache then extracts the double-word byte sequence required. The unused 56 bytes, in the present example, are effectively thrown away.

Such unaligned cache reads in the prior art are costly in terms of clock cycles and power consumption. Power is consumed in the cache read, and therefore, power is wasted in reading the entire cache line to perform an unaligned read. Additionally, power is consumed in the formatting circuitry. The use of clock cycles to extract the desired data in the formatter increases the latency associated with an unaligned read. Thus, there is a need in the art for methods and apparatus which increase the speed of an unaligned read, and additionally alleviates the wasted consumption of power associated with an unaligned read according to the prior art.

SUMMARY OF THE INVENTION

The aforementioned needs are addressed by the present invention. Accordingly, there is provided, in a first form, an apparatus for cache reads. The apparatus includes a cache line having a plurality of storage units wherein each storage unit is operable for storing a data signal from a bus. The bus is operable for communicating a plurality of data signals, and a first sequence of data signals is remapped into a second sequence of data signals in said plurality of storage units.

There is also provided, in a second form, a data processing system. The data processing system includes a central processing unit (CPU), a bus operable for communicating a plurality of data signals, and a cache coupled to the bus, operable for reading in response to an address from the CPU. The cache includes a cache line having a plurality of storage units wherein each storage unit is operable for storing a data signal received on the bus, and wherein a first sequence of data signals is remapped into a second sequence of data signals in said plurality of storage units.

Additionally, there is provided, in a third form, a method of unaligned cache reads. The method includes the steps of remapping a plurality of data signals for storage into a cache line including a plurality of storage units, and selecting a subset of the plurality of storage units for reading in response to an address therefor.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The present invention provides an apparatus and methods for unaligned cache reads. Data is stored in a cache line in remapped fashion. The ordering of the data is remapped into the storage elements of the cache. Data is output from the cache via a plurality, N, of multiplexers (MUXs). The MUXs are controlled using a programmable logic array (PLA) like structure that decodes the read address and outputs control signals to the MUXs. The MUXs output a sequence of data values, each of which may correspond to a plurality of bits. The sequence output by the MUXs may be a permuted sequence corresponding to the data value at the unaligned read address, and the next N−1 data values.

The permuted sequence output by the MUXs may then be sequenced by a rotation.

In the following description, numerous specific details are set forth such as byte lengths, word lengths, cache line lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

Refer now to the drawings wherein depicted elements are not necessarily shown to scale and wherein like or similar elements are designated by the same reference numeral through the several views.

Figure 1:
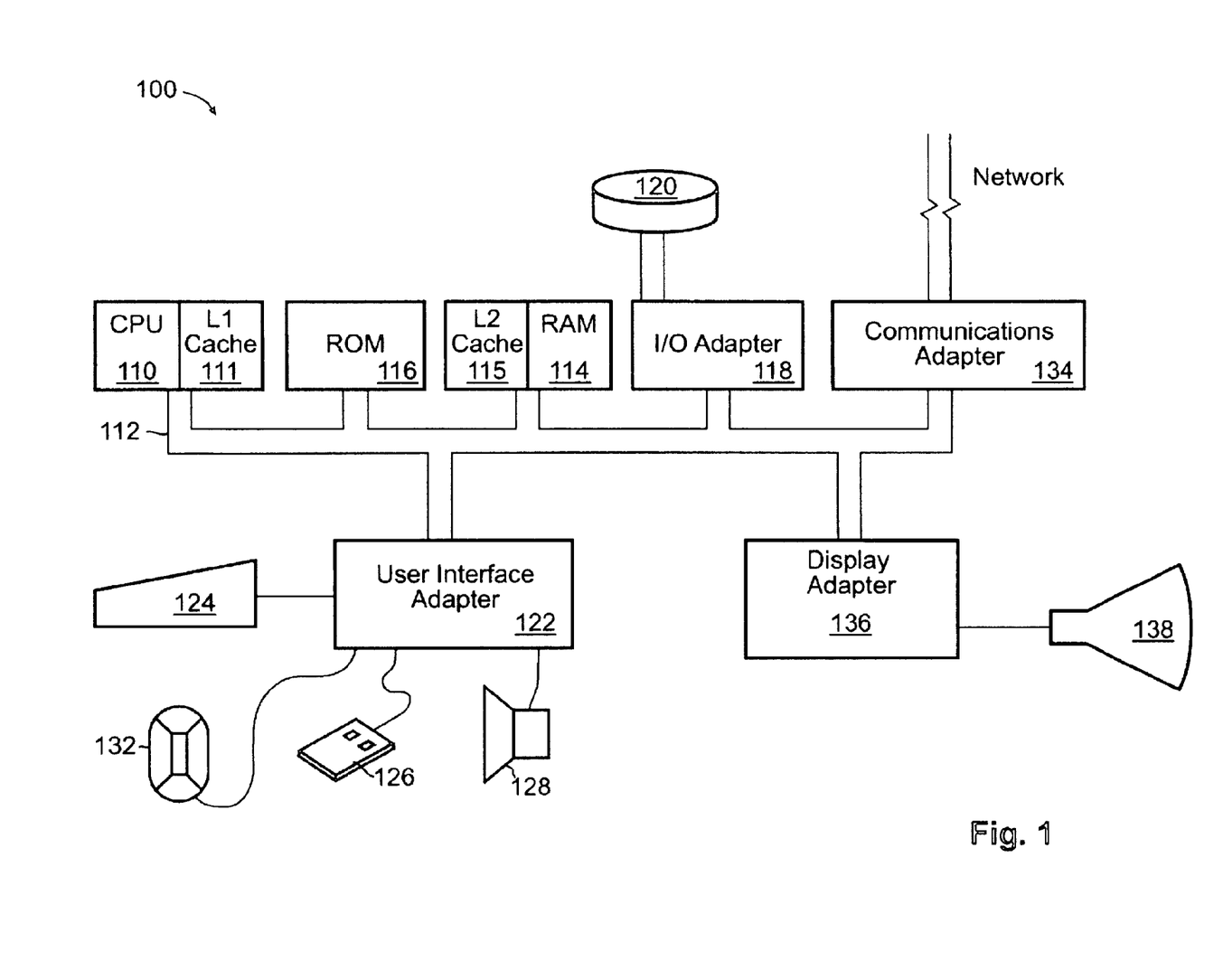
FIG. 1 illustrates a data processing system in accordance with an embodiment of the present invention.

A representative hardware environment for practicing the present invention is depicted in FIG. 1, which illustrates a typical hardware configuration of data processing system 100 in accordance with the subject invention having central processing unit (CPU) 110, such as a conventional microprocessor, and a number of other units interconnected via system bus 112. Data processing system 100 includes random access memory (RAM) 114, read only memory (ROM) 116, and input/output (I/O) adapter 118 for connecting peripheral devices such as disk units 120 and tape drives 140 to bus 112, user interface adapter 122 for connecting keyboard 124, mouse 126, and/or other user interface devices such as a touch screen device (not shown) to bus 112, communication adapter 134 for connecting workstation 113 to a data processing network, and display adapter 136 for connecting bus 112 to display device 138. A portion of RAM 114 may include a level 2 (L2) cache 115 having an unaligned cache read apparatus of the present invention. CPU 110 may include a level 1 (L1) cache 111 incorporating an unaligned read mechanism in accordance with the present invention. CPU 110 may, additionally, include other circuitry not shown herein, which will include circuitry commonly found within a microprocessor, e.g., execution unit, bus interface unit, arithmetic logic unit, etc. CPU 110 may also reside on a single integrated circuit.

Figure 2:
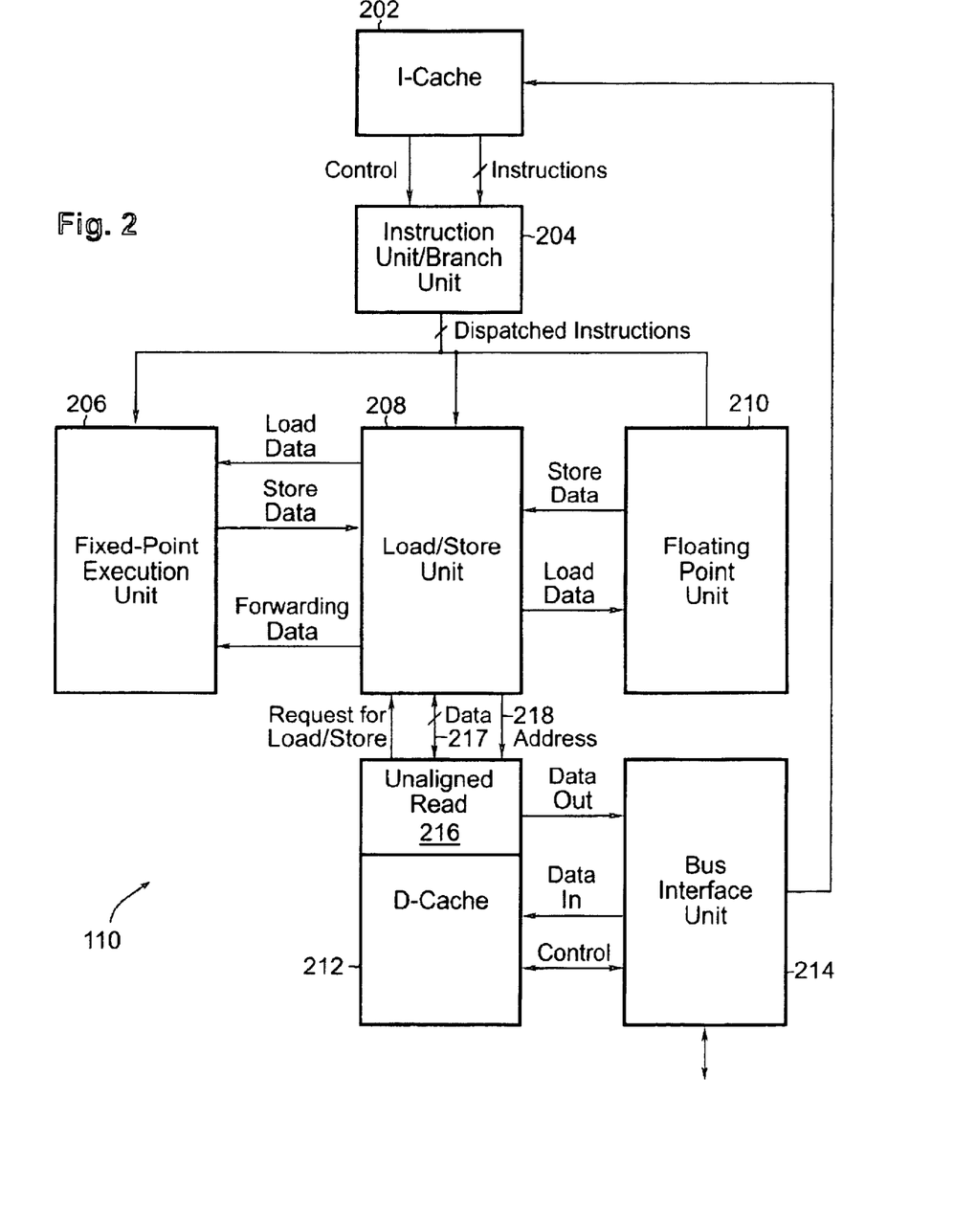
FIG. 2 illustrates, in block diagram form, a central processing unit in accordance with an embodiment of the present invention.

FIG. 2 illustrates a portion of CPU 110 in greater detail. The portion of CPU 110 comprises an instruction cache (I-cache) 202, a dispatch unit 204, a fixed point execution unit (FXU) 206, a load/store unit 208, a floating point unit (FPU) 210, a data cache (D-cache) 212, and a bus interface unit (BIU) 214. In an architecture of the portion of CPU 110, the L1 cache includes a separate instruction portion, I-cache 202, and a separate data portion, D-cache 212. However, in an alternative embodiment, the L1 cache may be a combined data and instruction cache, such as L1 cache 111 in FIG. 1. I-cache 202 is coupled to dispatch unit 204 to communicate control information in a plurality of instructions. Dispatch unit 204 is coupled to each of branch/system processing unit 205, FXU 206, load/store unit 208, and FPU 210 to provide a plurality of dispatched instructions. I-cache 202 is coupled to BIU 214 to communicate data and control information. I-cache 202 includes an unaligned read unit 216 according to the principles of the present invention. FXU 206 is coupled to load/store unit 208 to communicate a load data value, a store data value, and a forwarding data value. Load/store unit 208 is coupled to FPU 210 to communicate a store data value and a load data value. Load/store unit 208 is also coupled to D-cache 212 to communicate a request for a load/store signal, a plurality of data values 217, and an address value. D-cache 212 is coupled to bus interface unit 214 to communicate a data in signal, a data out signal, and a control signal. D-cache 212 includes an unaligned read unit 216 according to the principles of the present invention.

Refer now to FIG. 3 illustrating an unaligned read apparatus 216 in accordance with the present invention. (It would be understood by an artisan of ordinary skill, that although termed an unaligned read apparatus, aligned reads also are performed by the apparatus in the same way.) Apparatus 216 includes cache line 302 which constitutes a plurality, N, of M-storage-unit groups 304. Each M-storage-unit group 304 contains a predetermined plurality, M, of storage units. Each storage unit may contain a predetermined plurality, J, of data bits, which in an embodiment of the present invention may correspond to a conventional eight bit byte. Thus, for example, each storage unit may constitute a predetermined plurality of static random access memory (SRAM) cells.

As an example, a bus may have sixty-four bytes, and may communicate data in sixty-four byte sequences to a cache line having sixty-four bytes segmented in eight groups of eight bytes each. Conventionally, for such a configuration, sixty-four bytes, in sequential order 0 through 63, from the bus are stored in the cache line, in the same sequential order as on the bus, so that bytes 0 through 07 are in group 0, and bytes 8 through 15 are in group 01, etc. This may be seen in FIG. 3B illustrating a conventional cache memory, having cache line 302 sequentially coupled to bus 314. As described hereinabove, an unaligned read extracts the entire cache line 302 and format logic 325 extracts the required sequence and outputs it to data bus 217, FIG. 2.

According to the invention, the bus is coupled to the cache in a predetermined order, wherein bytes of the bus are interleaved with respect to bytes of the cache. That is, for example, lines for byte 0 are coupled to the byte 0 of cache group 0, lines for byte 01 are coupled to byte 0 of cache group 01, lines for byte 02 are coupled to byte 0 of cache group 02, etc. This is in contrast to the conventional arrangement, above, wherein lines for bytes 0 through bytes 07 are coupled to bytes 0 through 07 of group 0, lines for bytes 08 through 15 are coupled to bytes 0 through 07 of group 01, etc.

The interleaving may be accomplished in an embodiment of the present invention by portions of lines of the bus being disposed on a substrate with byte groups of the lines being interleaved with respect to bytes of the cache lines. This is illustrated in FIG. 3C, showing a portion of an unaligned read unit 216 having a sixty-four byte cache line 302. It would be understood by an artisan of ordinary skill that an unaligned read unit 216 having a cache line 302 with other numbers of bytes of data may be implemented in the same way, and such an embodiment would be within the spirit and scope of the present invention. Alternatively, it may be accomplished by logic circuitry, interposed between the bus and the cache line, which interleaves the data from the bus to the cache by logic gates. FIG. 3D illustrates such an alternative embodiment. Bus 314 is provided to remap logic 327, which reorders the data on each of lines forming bus 314 for storage into cache line 302.

Figure 3A:
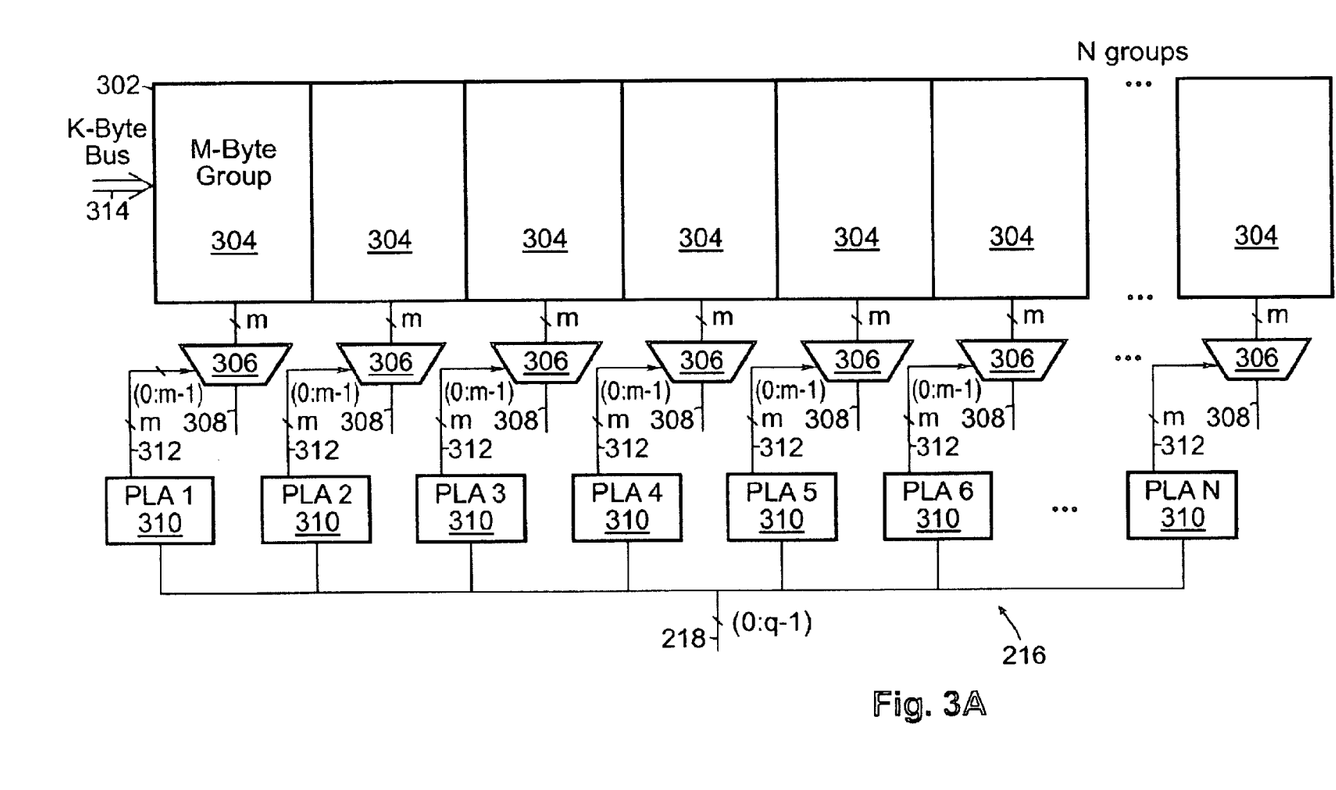
FIG. 3A illustrates, in block diagram form, an unaligned cache read mechanism in accordance with an embodiment of the present invention.
Figure 3B:
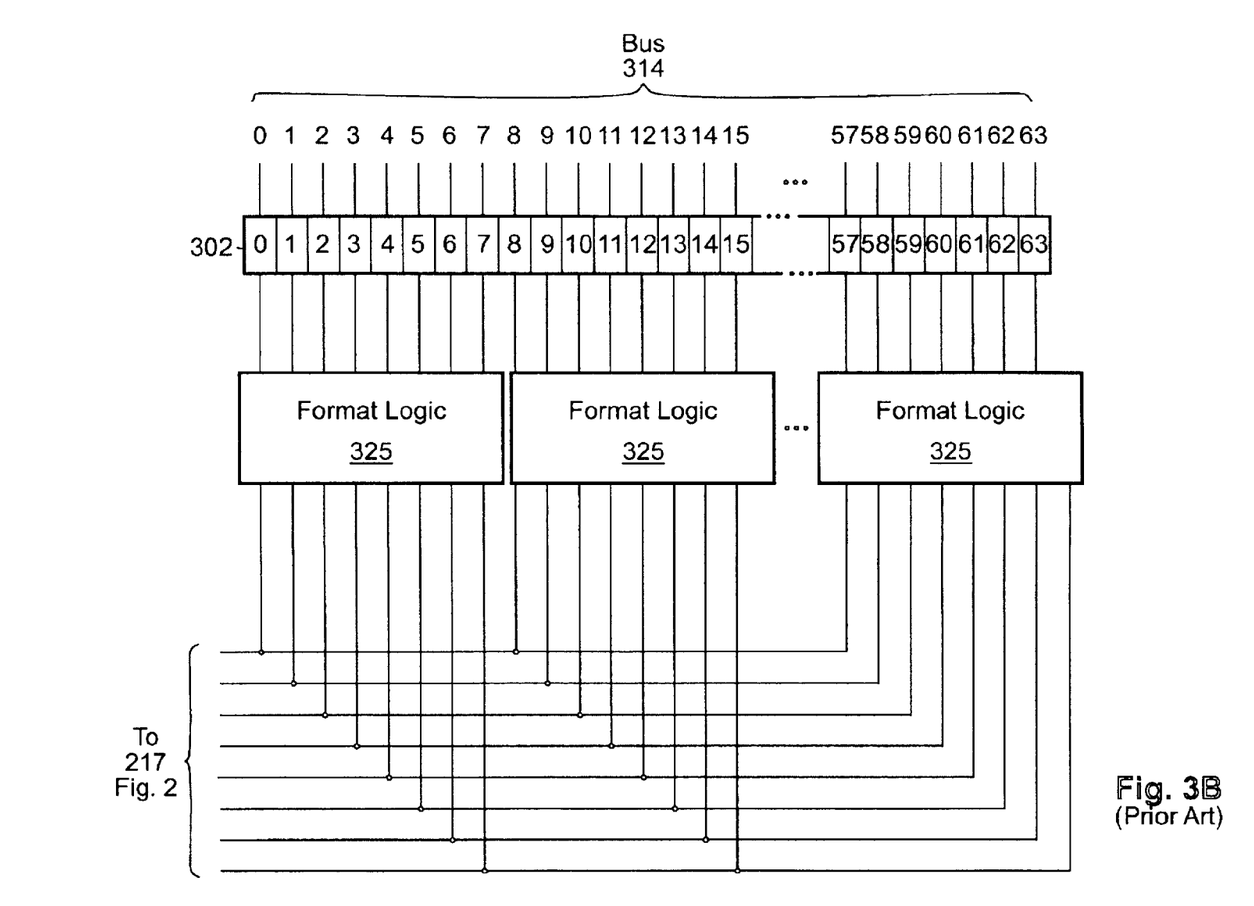
FIG. 3B illustrates, in block diagram form, a portion of conventional unaligned read mechanism.
Figure 3C:
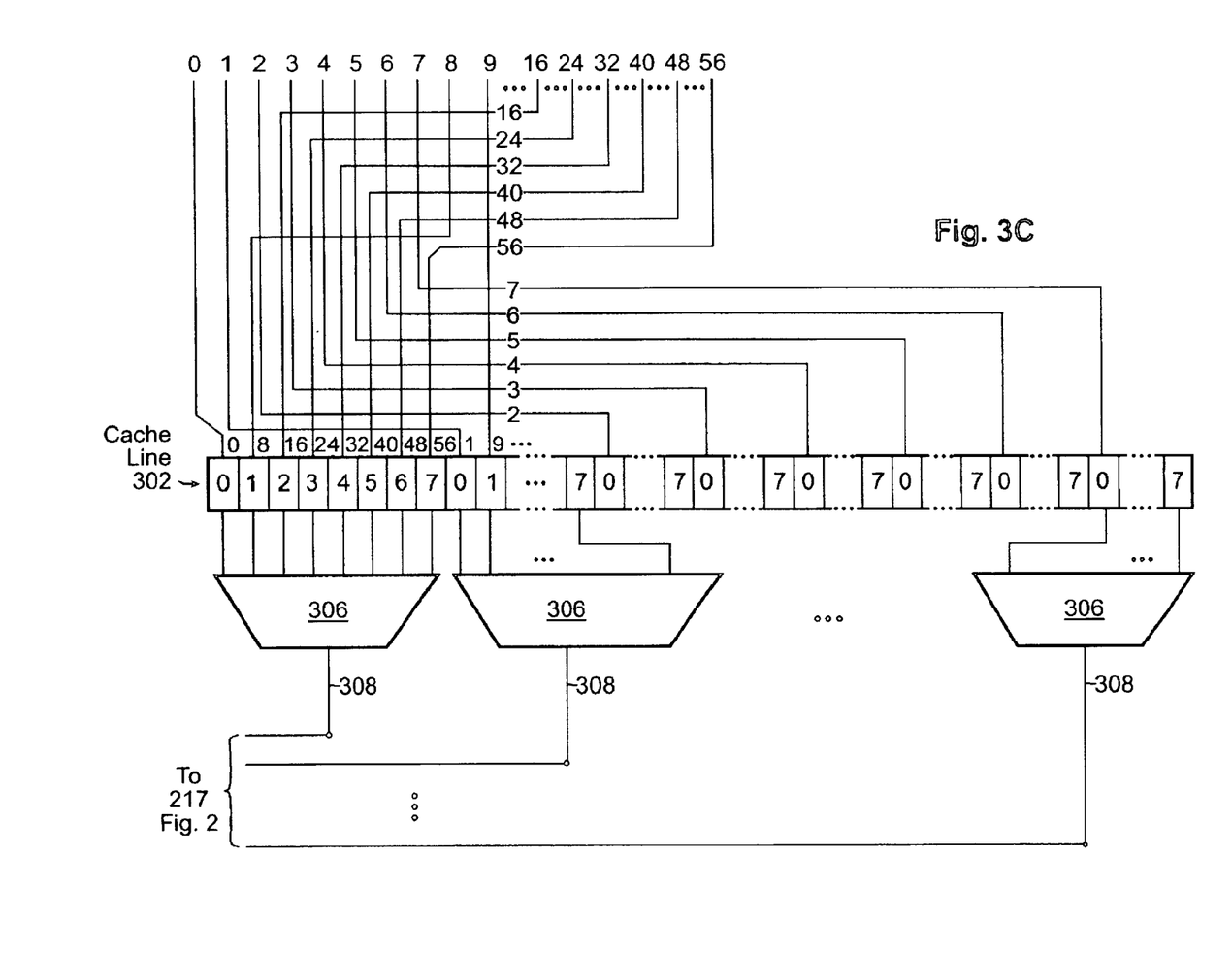
FIG. 3C illustrates, in block diagram form, a portion of an unaligned read mechanism in accordance with an embodiment of the present invention.
Figure 3D:
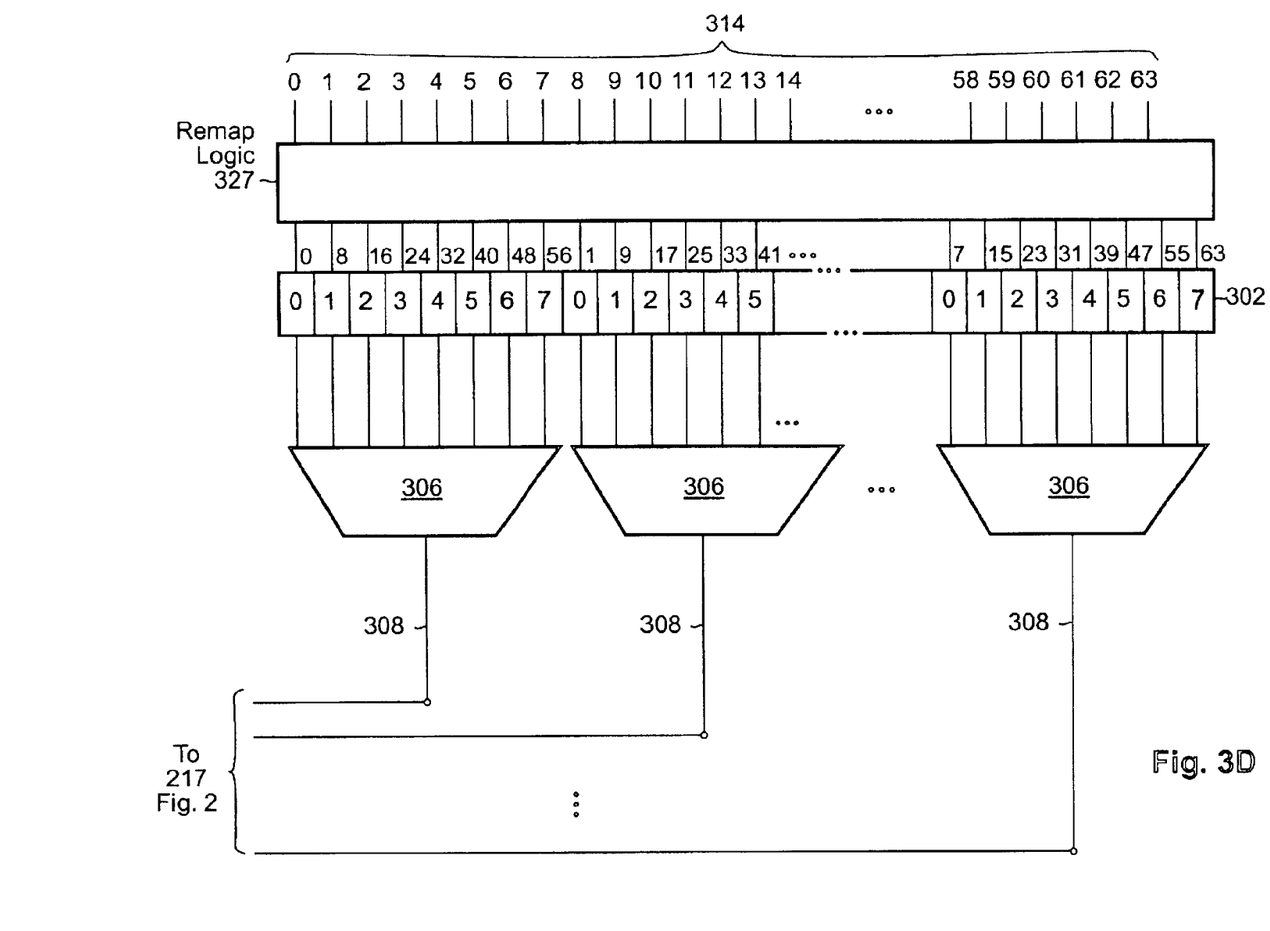
FIG. 3D illustrates, in block diagram from, a portion of an unaligned read mechanism in accordance with an alternative embodiment of the present invention.

Returning to apparatus 216 in FIG. 3A, having a cache line 302 with N groups, each M-storage-unit group 304 is coupled to one of a plurality of MUXs 306. Each of MUXs 306 is operable for outputting a preselected data value from a corresponding one of M-storage-unit groups 304. Outputs 308 from each MUXs 306 are provided to data 217, FIG. 2.

Each of MUXs 306 is controlled by a corresponding combinatoric logic circuit, which may be, and for simplicity, will be referred to as, a programmable logic array (PLA), one of PLA 1-PLA N 310. In an embodiment of the present invention, a PLA 310 may be a VLSI PLA circuit. Alternatively, PLAs 310 may be formed from AND/OR combinatoric logic incorporated into the cache structure itself. PLA 1 through PLA N output an M-bit control signal to the corresponding one of MUXs 306, and are "programmed" to select a data value from each of M-storage-unit groups 304 in accordance with the address of the read operation. This will be discussed further in conjunction with FIGS. 4A–4B and 5A–5B.

Cache line 302 contains a plurality, K, of storage units. Data is coupled into a cache line 302 via a K-signal bus 314, each signal of which may itself represent the J-fold plurality of bits corresponding to a data value. Thus, the product of M by N is equal to K. Each PLA 310 decodes q bits of the read address, such as address 218, in FIG. 2. It would be understood by an artisan of ordinary skill that q is such that $2^q$ is not less than K.

Figure 4A:
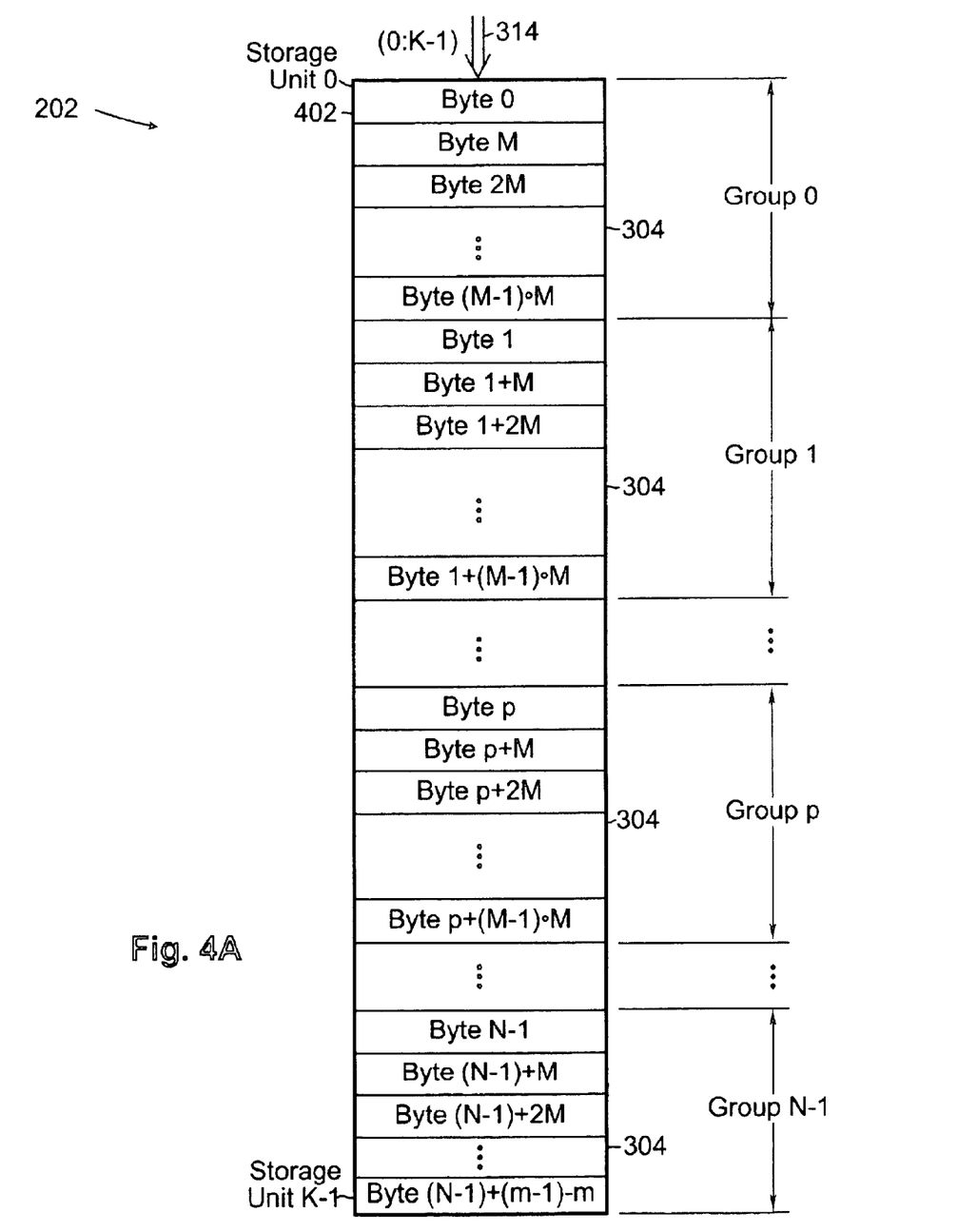
FIG. 4A schematically illustrates a cache line in accordance with an embodiment of the present invention.

The operation of unaligned read apparatus 216 may be further understood by referring now to FIG. 4A in which is illustrated an embodiment of cache line 302 in accordance with the present invention. Cache line 302 contains a total number K of storage units 402 in N groups 304 each of which contains M storage units 402. Each of K data values received on K-signal bus 314 is stored in a storage unit 402, which itself contains J cells storing the respective J bits of each data value. However, the data signal ordering on K-signal bus 314 need not be identically mapped into the storage units 402 constituting cache line 302. In other words, consecutively numbered signals (or equivalently, data values) on bus 314 (0:K-1) need not be identically mapped into consecutively numbered storage units 402 in cache line 302. A first sequence formed by the data signals on bus 314 may be remapped into a second, different, sequence in the plurality of storage units 402. Bus 314 may be remapped into the storage elements 402 via a predetermined map, which may be reflected in the layout of the interconnects between bus 314 and the storage units 402 in fabricating an integrated circuit chip.

Cache line 302 illustrated in FIG. 4A corresponds to an embodiment of such a remapping in accordance with the present invention. Each of groups 304 includes M storage units 402. A first group 304 includes data values 0, M, 2M, . . . (M−1)·M, in consecutive storage units 402. A second group 304 includes data values 1, 1+M, 1+2M, . . . 1+(M−1)·M. A pth group 304 in cache align 302 includes, in consecutive storage units 402, values p, p+M, p+2M, . . ., p+(M−1)·M. The Nth group 304 in cache line 302 contains values N−1, (N−1)+M, (N−1)+2M, . . . ,(N−1)+(M−1)·M.

As described hereinabove, M and N are factors of K. Additionally, in the exemplary embodiment of cache line 302 illustrated in FIG. 4A, in order that the remapping be one-one, the number of groups, N, is less than or equal to the number, M, of storage units in each group.

Figure 4B:
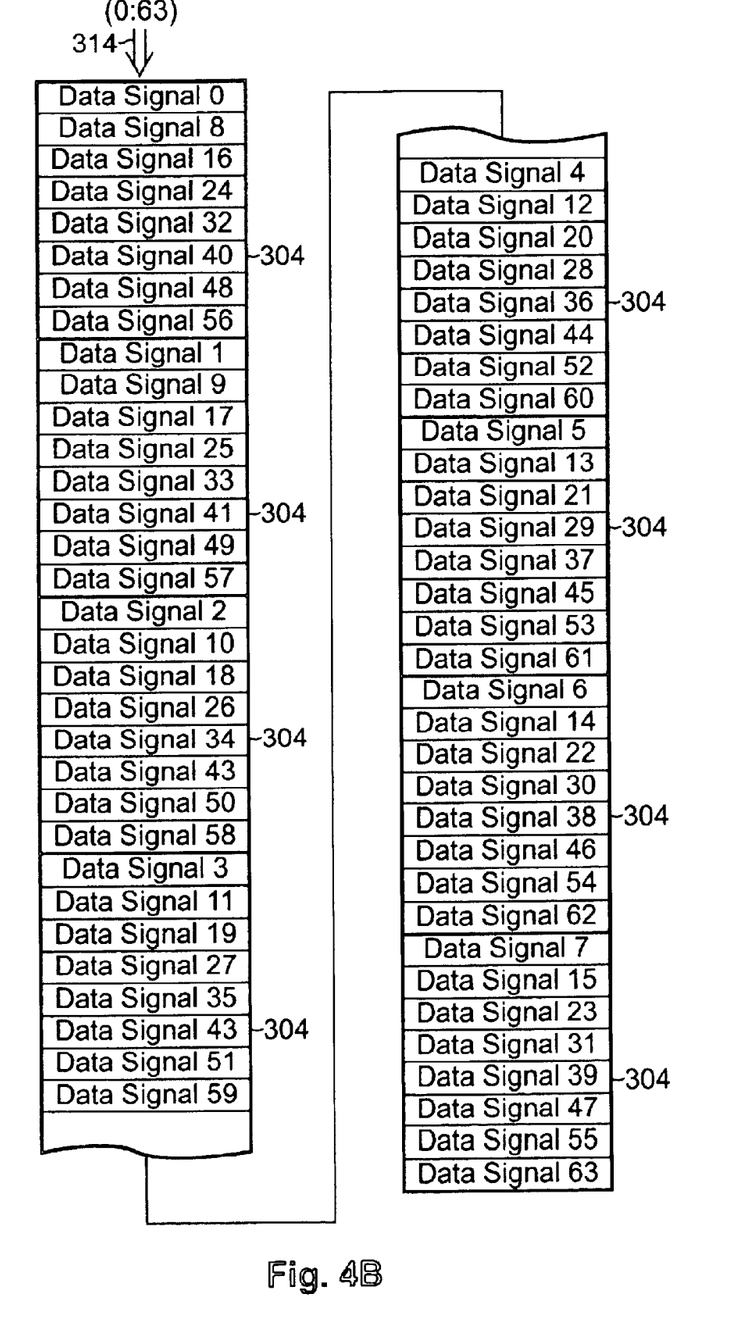
FIG. 4B schematically illustrates a cache line in accordance with another embodiment of the present invention.

The remapping of bus 314 may be further understood by referring to FIG. 4B illustrating an exemplary embodiment of cache line 302 in accordance with the cache line 302 of FIG. 4A having eight groups 304 of eight storage units 402 each. Thus, bus 314 includes sixty-four signals (0:63), each of which may itself be J bits wide. In an embodiment of the present invention, J may be a byte. The mapping of FIG. 4A yields the mapping shown in FIG. 4B for the exemplary embodiment having M=N=8.

Figure 5A:
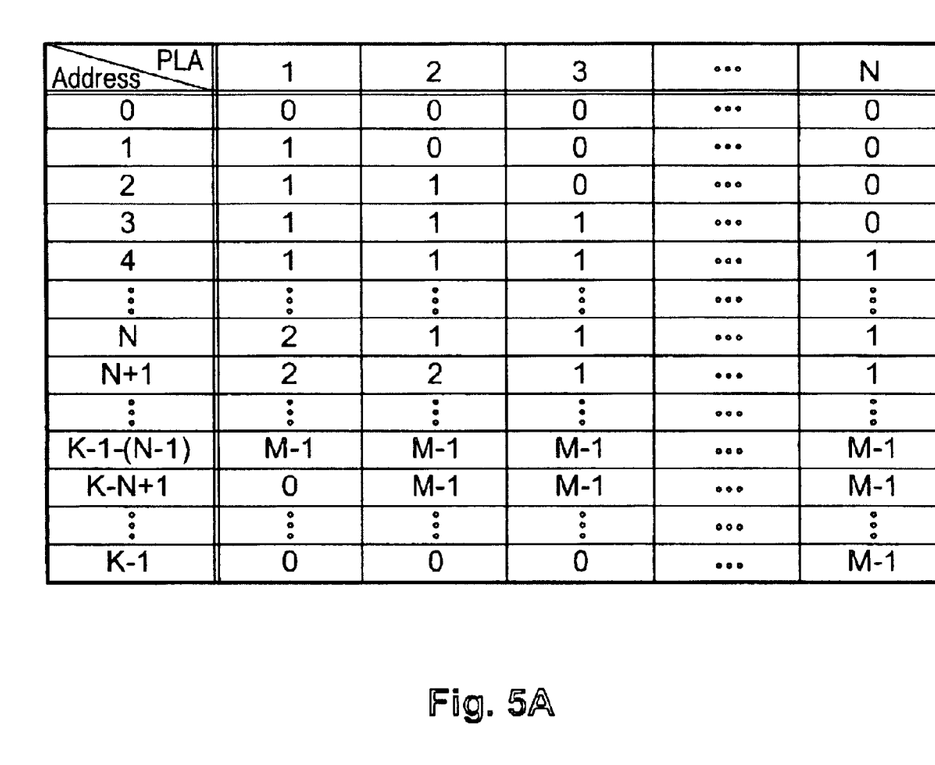
FIG. 5A illustrates a mapping table in accordance with an embodiment of the present invention.

As previously described, each PLA 310, in FIG. 3, decodes the q bits of the read address, and outputs an M−1 bit control signal to a corresponding one of MUXs 306. For the exemplary embodiment of cache line 302 illustrated in FIG. 4A, each of PLAs 310 outputs control signals in accordance with a mapping of the read address illustrated in FIG. 5A. In the mapping of FIG. 5A, the value illustrated in the table entry is the bit number of the M−1 bit control signal that is asserted. All other bits of the M-1 bit control signal are negated.

Figure 5B:
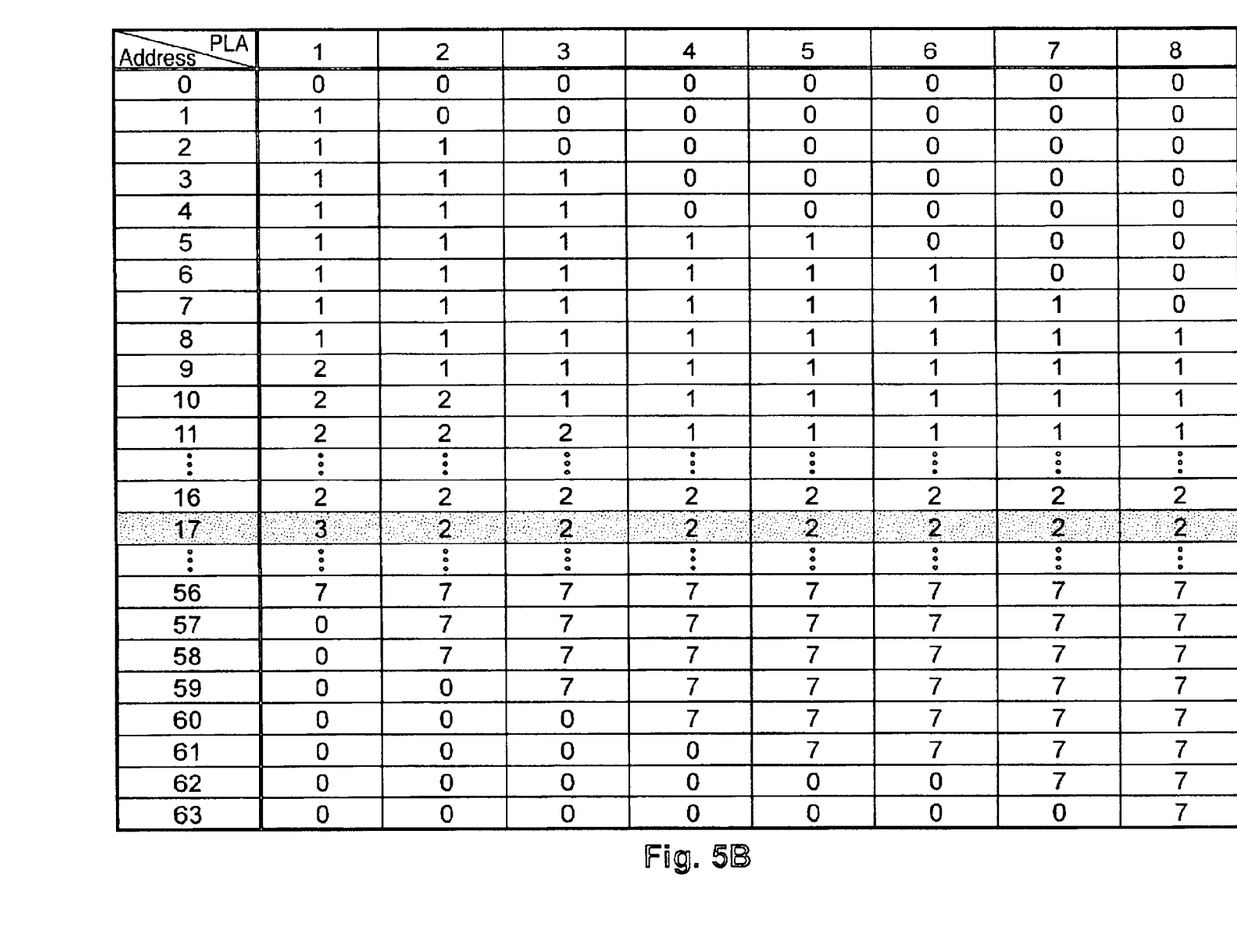
FIG. 5B illustrates a mapping table in accordance with another embodiment of the present invention.

An exemplary mapping in accordance with FIG. 5A, in which cache line 302 includes eight groups 304 containing eight data values each, that is, M=N=8, is illustrated in FIG. 5B. In such an embodiment, as discussed in conjunction with FIG. 4B, above, cache line 302 contains sixty-four data values, with addresses (0:63) represented in a first column of FIG. 5B. Cache line 302 in that embodiment contains eight groups 304, each of which contains eight data values. Associated with each of the eight groups 304 is a MUX 306 and a corresponding PLA 310 represented by a first row in FIG. 5B. Each PLA 310 outputs an eight bit control signal, numbered (0:7). For a given read address, the values illustrated in the corresponding row denote the output bit asserted by each of the eight PLAs 310. The remaining seven bits are all negated. Thus, for example, if an unaligned read address is 17 for the data value at that address and the seven consecutive data values at addresses (18:24), then PLA 1 asserts output bit number three, and PLA 2 through PLA 8 each assert output bit number two. This is indicated by the shaded row in FIG. 5B. In response, the MUX 306 corresponding to PLA 1 outputs the data value at address 24, the MUX 306 corresponding to PLA 2 outputs the data value at address 17, the MUX 306 corresponding to PLA 3 outputs the data value at address 18, and so forth. The data values output may then be resequenced to correspond to an ascending order by a "left" rotation by one.

For unaligned read addresses that extend past an end of the cache line, only a portion of the output data values are valid. In an embodiment of the present invention in accordance the address mapping illustrated in FIGS. 5A and 5B, the read wraps back to a beginning of the cache line. This corresponds, in FIG. 5B, to the value 0 associated with PLA 1 at address 57, and zero bits being asserted by PLAs 2, 3, etc. for read addresses 58, 59, etc. Likewise, in FIG. 5A, PLA 1 asserts the zero bit at address K-N+1. For unaligned read addresses higher than K-N+1, additional PLAs 310 assert their corresponding zero bit, as indicated in the mapping illustrated in FIG. 5A. The bytes output by the corresponding MUXs 306 for such unaligned reads are ignored. Alternatively, in an embodiment of the present invention in which MUXs 306 are dynamic, an unaligned read address that extends past the end of the cache line may be implemented by maintaining the corresponding MUXs in a reset state. Invalid bytes output by these MUXs are also ignored.

The present invention provides an unaligned cache read mechanism. The memory bus is remapped into the cache line which is subdivided into a plurality of storage units, each of which stores a data value which may have a plurality of bits. Each group has a corresponding MUX with inputs operable for receiving a corresponding one of the data values in the group. Each MUX outputs one of the data values in the group in response to a control signal received from an associated PLA. The PLAs, and the MUXs, may be implemented within the cache structure itself. The PLAs decode the read address and output a control signal to its associated MUX. In this way, the data values addressed by an unaligned read are output without the necessity of reading the entire cache line, or for multiple aligned reads, and the subsequent reformatting required by either, thereby avoiding the clock cycles consumed by these operations, and the power wasted by reading unused bytes.

Although the present invention and its advantages have been described in detail, it should be understood that various changes, substitutions and alterations can be made herein without departing from the spirit and scope of the invention as defined by the appended claims.

What is claimed is:

1. An apparatus for cache reads comprising a bus, coupled to a cache, for transmitting data, including bytes of data, to storage in the cache, the cache having cache blocks, with the bytes of the cache blocks being distributed among a number of groups, wherein the coupling includes byte ordering on the bus being interleaved with respect to byte ordering in the cache; and circuitry for selectively accessing corresponding ones of the bytes from each ones' respective group of the cache blocks.

2. The apparatus of claim 1 wherein the interleaved coupling comprises each one of the bytes in a word of the bus being coupled to one of the cache line groups that is different than the ones of the cache line groups to which each other one of the bytes in the word is coupled.

3. The apparatus of claim 1 wherein the interleaved coupling comprises the bus lines being physically disposed on the substrate with one byte of the bus interleaved in relative ordering with respect to other bytes of the bus.

4. The apparatus of claim 1 wherein the interleaved coupling comprises logic circuitry, interposed between the bus and the cache line, for interleaving the data from the bus, with respect to the cache, under the control of logic gates.

* * * * *

UNITED STATES PATENT AND TRADEMARK OFFICE
CERTIFICATE OF CORRECTION

| | | |
|---|---|---|
| PATENT NO. | : 6,915,385 B1 | Page 1 of 4 |
| APPLICATION NO. | : 09/364449 | |
| DATED | : July 5, 2005 | |
| INVENTOR(S) | : Leasure et al. | |

It is certified that error appears in the above-identified patent and that said Letters Patent is hereby corrected as shown below:

On Title Page of patent, item (75) Inventors, please replace "George Mcneil" with --George McNeil--.

Column 7, line 5 through column 8, line 11 please replace all claims with the following claims:

-- 1 An apparatus for cache read operations comprising:
a cache line having a plurality of storage units wherein each storage unit is operable for storing a data signal from a bus operable for communicating a plurality of data signals, and wherein a first sequence of said plurality of data signals is remapped into a second sequence of data signals in said plurality of storage units wherein said plurality of storage units further comprises a plurality of groups of storage units, and wherein each group of the plurality of groups is operable for reading a data value from a corresponding storage unit in said group, wherein said plurality of groups comprises a number, N, of groups, wherein each group comprises a number, M, of storage units, and wherein said plurality of data signals comprises a number, K, of signals, such that $K = M*N$, wherein, for $0 \leq r \leq N$, an rth group has a first storage unit operable for storing a data value received on an rth data line, a second storage unit operable for storing a data value received on an $(r + M)$th data line, a third storage unit operable for receiving a data value received on an $(r + 2M)$th data line, and an Mth storage unit operable for storing a data value received on an $(r + (M-1)M)$th data line, and, for $3 \leq s \leq M-2$, storage units operable for receiving data values on $(r + sM)$ th data lines.

2. A data processing system comprising:
a central processing unit (CPU);
a bus operable for communicating a plurality of data signals;
a cache coupled to said bus, operable for reading in response to an address from said CPU, wherein said cache includes a cache line having a plurality of storage units, wherein each storage unit is operable for storing a data signal received on said bus, wherein a first sequence of said plurality of data signals is remapped into a second sequence of data signals in said plurality of storage units wherein said plurality of storage units further comprises a plurality of groups of storage units, and wherein each group is operable for reading a data value from a corresponding storage unit in said group; and a plurality of logic arrays, each logic array associated with a corresponding group of storage units, wherein each logic array is operable for receiving said address and outputting a signal operable for selecting said data value.

UNITED STATES PATENT AND TRADEMARK OFFICE
CERTIFICATE OF CORRECTION

| | |
|---|---|
| PATENT NO. | : 6,915,385 B1 |
| APPLICATION NO. | : 09/364449 |
| DATED | : July 5, 2005 |
| INVENTOR(S) | : Leasure et al. |

It is certified that error appears in the above-identified patent and that said Letters Patent is hereby corrected as shown below:

3. The data processing system of claim 2 further comprising a plurality of multiplexers (MUX) wherein each MUX is associated with a corresponding group of storage units, each having a plurality of inputs operable for receiving a data value from a corresponding storage unit in said group, and wherein each MUX is operable for selecting one of said data values in response to said signal operable for selecting said data value.

4. A data processing system comprising:
a central processing unit (CPU);

a bus operable for communicating a plurality of data signals; and a cache coupled to said bus, operable for reading in response to an address from said CPU, wherein said cache includes a cache line having a plurality of storage units, wherein each storage unit is operable for storing a data signal received on said bus, wherein a first sequence of said plurality of data signals is remapped into a second sequence of data signals in said plurality of storage units wherein said plurality of storage units further comprises a plurality of groups of storage units, and wherein each group is operable for reading a data value from a corresponding storage unit in said group;

wherein said plurality of groups comprises a number, N, of groups, wherein each group comprises a number, M, of storage units, said plurality of data signals comprising a number, K, of signals, such that $K = M*N$, and wherein, for $0 \leq r \leq N$, an rth group has a first storage unit operable for storing a data value received on an rth data line, a second storage unit operable for storing a data value received on an $(r + M)$th data line, a third storage unit operable for receiving a data value received on an $(r + 2M)$th data line, and an Mth storage unit operable for storing a data value received on an $((r + (M-1)M)$th data line, and, for $3 \leq s \leq M-2$, storage units operable for receiving data values on $(r + sM)$ th data lines.

5. A method of unaligned cache read operations comprising the steps of:
remapping a plurality of data signals for storage into a cache line including a plurality of storage units;

selecting a subset of said plurality of storage units for reading in response to an address therefor;

wherein said step of selecting said subset comprises the step of selecting each storage unit from a corresponding one of a plurality of groups of storage units;

wherein said step of selecting said subset comprises the steps of:

for each group, providing a selection circuit operable for outputting a signal on one of a plurality of inputs, wherein each input is coupled to one of a plurality of storage units in said group; and outputting said signal in response to said address.

6. The method of claim 5 wherein said selection circuit comprises a multiplexer (MUX) having a plurality of inputs, each input being coupled to one of said plurality of storage units in said group, wherein said MUX is operable for selecting for outputting a signal on one of said inputs.

UNITED STATES PATENT AND TRADEMARK OFFICE
CERTIFICATE OF CORRECTION

| | |
|---|---|
| PATENT NO. | : 6,915,385 B1 |
| APPLICATION NO. | : 09/364449 |
| DATED | : July 5, 2005 |
| INVENTOR(S) | : Leasure et al. |

It is certified that error appears in the above-identified patent and that said Letters Patent is hereby corrected as shown below:

7.. A method of unaligned cache read operations comprising the steps of:
remapping a plurality of data signals for storage into a cache line including a plurality of storage units;

selecting a subset of said plurality of storage units for reading in response to an address therefor;

wherein said step of selecting said subset comprises the step of selecting each storage unit from a corresponding one of a plurality of groups of storage units;

wherein said step of selecting said subset comprises the steps of:

for each group, providing a selection circuit operable for outputting a control signal for selecting a data value, wherein said control signal is output in response to said address; and outputting said signal in response to said control signal.

8. A method of unaligned cache read operations comprising the steps of:
remapping a plurality of data signals for storage into a cache line including a plurality of storage units;

selecting a subset of said plurality of storage units for reading in response to an address therefor; and sequencing a set of data values output in response to said selecting step;

wherein said step of selecting said subset comprises the step of selecting each storage unit from a corresponding one of a plurality of groups of storage units.

9. The method of claim 8 wherein said sequencing step comprises the step of rotating said set of data values by a preselected number of positions.

10. The method of claim 7 wherein said control signal comprises a plurality of bits, and wherein a first bit is asserted and each remaining bit is negated in response to said address.

11. The method of claim 7 wherein said selection circuit comprises a programmable logic array (PLA).

12. An apparatus for cache reads comprising a bus, coupled to a cache, for transmitting data, including bytes of data, to storage in the cache, the cache having cache blocks, with the bytes of the cache blocks being distributed among a number of groups, wherein the coupling includes byte ordering on the bus being interleaved with respect to byte ordering in the cache; and circuitry for selectively accessing corresponding ones of the bytes from each ones' respective group of the cache blocks.

13. The apparatus of claim 12 wherein the interleaved coupling comprises each one of the bytes in a word of the bus being coupled to one of the cache line groups that is different than the ones of the cache line groups to which each other one of the bytes in the word is coupled.

UNITED STATES PATENT AND TRADEMARK OFFICE
CERTIFICATE OF CORRECTION

| | |
|---|---|
| PATENT NO. | : 6,915,385 B1 |
| APPLICATION NO. | : 09/364449 |
| DATED | : July 5, 2005 |
| INVENTOR(S) | : Leasure et al. |

It is certified that error appears in the above-identified patent and that said Letters Patent is hereby corrected as shown below:

14. The apparatus of claim 12 wherein the interleaved coupling comprises the bus lines being physically disposed on the substrate with one byte of the bus interleaved in relative ordering with respect to other bytes of the bus.

15. The apparatus of claim 12 wherein the interleaved coupling comprises logic circuitry, interposed between the bus and the cache line, for interleaving the data from the bus, with respect to the cache, under the control of logic gates.—

Signed and Sealed this

Fifteenth Day of August, 2006

JON W. DUDAS
*Director of the United States Patent and Trademark Office*